(12) United States Patent
Riopel et al.

(10) Patent No.: US 7,412,790 B2
(45) Date of Patent: Aug. 19, 2008

(54) EDGE-LIT PANEL WITH PHOTO-LUMINESCENT FEATURES

(75) Inventors: Pierre-Paul Riopel, St. Bruno (CA); Radu-Cornel Rapeanu, Mont-Royal (CA); Camille Descarries, Montreal (CA); Zhi Gang Xing, Montreal (CA)

(73) Assignee: Thomas & Betts International, Inc., Wilmington, DE (US)

( * ) Notice: Subject to any disclaimer, the term of this patent is extended or adjusted under 35 U.S.C. 154(b) by 158 days.

(21) Appl. No.: 11/237,526

(22) Filed: Sep. 28, 2005

(65) Prior Publication Data

US 2006/0080873 A1 Apr. 20, 2006

Related U.S. Application Data

(60) Provisional application No. 60/619,073, filed on Oct. 15, 2004.

(51) Int. Cl.
*G09F 13/18* (2006.01)
(52) U.S. Cl. ............................... 40/546; 40/547; 40/582; 40/542
(58) Field of Classification Search ........... 40/541–544, 40/570, 565, 566, 546; 362/300–634, 812, 362/84
See application file for complete search history.

(56) References Cited

U.S. PATENT DOCUMENTS

| | | | |
|---|---|---|---|
| 3,780,462 A | 12/1973 | Pregel et al. | |
| 4,245,282 A | 1/1981 | Sokol | |
| 4,420,898 A | 12/1983 | Moses | |
| 4,481,560 A | 11/1984 | Ra | |
| 4,715,137 A * | 12/1987 | Scheve | 40/546 |
| 4,805,324 A * | 2/1989 | Andersson | 40/541 |
| 4,912,605 A | 3/1990 | Whitehead | |
| 5,283,968 A * | 2/1994 | Williams | 40/546 |
| 5,446,629 A | 8/1995 | Steiger et al. | |
| 5,677,702 A | 10/1997 | Inoue et al. | |
| 5,724,909 A | 3/1998 | Pitman et al. | |
| 5,775,016 A | 7/1998 | Chien | |
| 5,961,072 A * | 10/1999 | Bodle | 244/118.5 |
| 6,159,878 A | 12/2000 | Marsh | |
| 6,237,266 B1 * | 5/2001 | Tassey et al. | 40/542 |
| 6,276,634 B1 | 8/2001 | Bodle | |
| 6,364,498 B1 | 4/2002 | Burbank | |
| 6,479,936 B1 | 11/2002 | Martinez | |
| 6,487,802 B2 * | 12/2002 | Suen | 40/542 |
| 6,539,657 B1 * | 4/2003 | Qualls et al. | 40/546 |
| 6,569,786 B1 | 5/2003 | Marsh | |
| 6,672,748 B2 | 1/2004 | Baldwin | |
| 6,843,010 B2 * | 1/2005 | Robinson et al. | 40/571 |
| 2004/0139636 A1 * | 7/2004 | Lin | 40/546 |

* cited by examiner

*Primary Examiner*—Lesley D. Morris
*Assistant Examiner*—Shin Kim
(74) *Attorney, Agent, or Firm*—Hoffmann & Baron, LLP

(57) ABSTRACT

The present invention discloses an edge-lit panel for emergency lighting using dual mode illumination. The panel includes active lighting by the own light source of the equipment and passive lighting by photo-luminescent pigments coated on various surfaces of the panel. Thus, this edge-lit panel provides an improved and extended visibility of electrically energized edge-lit emergency signs during power failures.

16 Claims, 6 Drawing Sheets

EDGE-LIT PANEL WITH PHOTO-LUMINESCENT FEATURES

CROSS-REFERENCE TO RELATED PROVISIONAL APPLICATION

This application claims priority to U.S. Provisional Application No. 60/619,073, filed Oct. 15, 2004.

FIELD OF INVENTION

The present invention relates generally to lighting sign applications and more specifically to an edge-lit panel with photo-luminescent features to provide illumination even during loss of power to the panel.

BACKGROUND OF THE INVENTION

The edge-lit panels with emergency light signs such as a lighted exit sign are well known in the art. Exit signage using photo-luminescent (PL) materials are becoming more and more popular in the industry. The majority of these products are not internally powered and the PL coating of the legend in the panel is charged in the ambient light. During a power failure the EXIT legend provides passive illumination (glow) for several hours. The main disadvantage of this method is that the performance of the exit sign depends on the ambient light level. Furthermore, the equipment must be installed at a specified distance from a permanent light source, which has to deliver a specified minimum luminance level.

Other solutions such as in U.S. Pat. No. 6,364,498 use EXIT signs with translucent legends where the PL coating is energized by the equipment's own light source, and is positioned behind the legend i.e., back-lit. This solution does not need ambient lighting for functioning. It uses a dual mode illumination, the active lighting with its own light source installed behind the display and passive lighting with photo-luminescent pigment coated on the display panel.

Alternative solutions of EXIT signage for emergency lighting use display panels with the active light source positioned on the edge of the display i.e. edge-lit, instead of back-lit. One such solution is shown and described in a co-pending commonly assigned U.S. patent application Ser. No. 10/898,649, filed Jul. 23, 2004 entitled, "Cold-Cathode Fluorescent Lamp Assembly for Lighting Applications". This application is incorporated by reference herein for all purposes. FIGS. 1 and 2 show typical methods of manufacturing edge-lit panels 10 for EXIT signs with a legend 11 and a contour 12. The light source 13 is applied on the panel edge, perpendicular to the display surface. The display i.e. legend 12 is illuminated as an effect of the multiple reflections 14 and refractions 15 of the light beams on the panel front 10a and back surfaces 10b. The legend coating 12 is applied either on the back 10b of the panel 10 as shown in FIG. 1 or on the panel front face 10a as shown in FIG. 2, with this second option allowing for a better background illumination.

It is thus desirable to provide an improved edge lit panel having improved and extended visibility.

SUMMARY OF THE INVENTION

In one embodiment of the present invention there is provided an edge lit panel including a front side and a back side. The back side includes a frosted clear acrylic surface with a white opaque lamination glued on the frosted surface. A layer of photo-luminescent material is disposed entirely on the back side. A legend is printed on the front side using first and second layers of semi-transparent materials. The first layer is white and second layer is colored.

In another embodiment of the present invention, there is shown an edge lit panel including a front side and a back side. The back side includes a frosted clear acrylic surface with a white opaque lamination glued on the frosted surface. The legend is printed on the front side using first and second layers of semi-transparent materials. The first layer is white and the second layer is colored. A contour is engraved on the legend on the front side. Also, the photoluminescent material is disposed only on the engraved contour on the front side of the panel.

In an alternate embodiment of the present invention, there is shown an edge lit panel having a front side and a back side with a legend printed on the backside. The legend includes first and second layers of semi-transparent materials with the first layer being white and the second layer being colored. Also, a contour is engraved on the legend on the back side. The photo-luminescent material is disposed only on the engraved contour on the back side of the panel.

In another alternate embodiment of the present invention, there is shown an edge lit panel with a front side and a back side with the back side including an opaque lamination. The legend is printed on the back side using first and second layers of semi-transparent materials. The first layer is white and the second layer is colored. Also, the photoluminescent material is disposed only on the legend.

DETAILED DESCRIPTION OF THE INVENTION

An edge-lit panel of an emergency sign according to the present invention uses dual mode illumination. One mode is active lighting by the own light source of the equipment and the other mode is passive lighting by photo-luminescent (PL) pigments or material coated on the panel. The PL material is energized by the light source of the equipment. During a power failure, after the equipment back-up power has depleted and its light source has extinguished, the PL-based legend components (text, text contour, and background) will still glow in the dark for several hours, indicating the path of egress, as described in greater detail hereinbelow.

Figure 1:
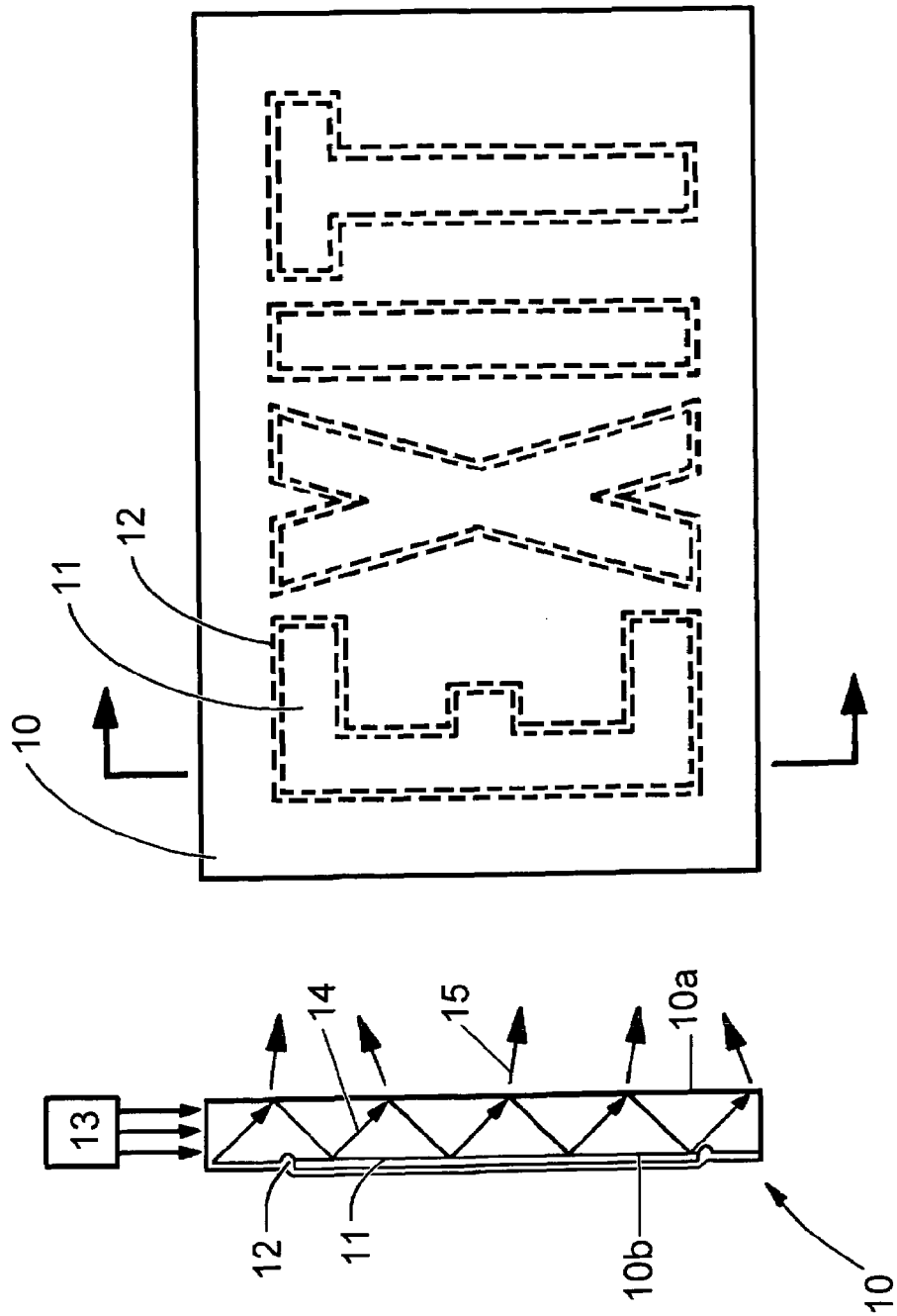
FIG. 1 is a perspective view of a prior art edge-lit emergency sign with legend coating applied on the back of the panel.
Figure 2:
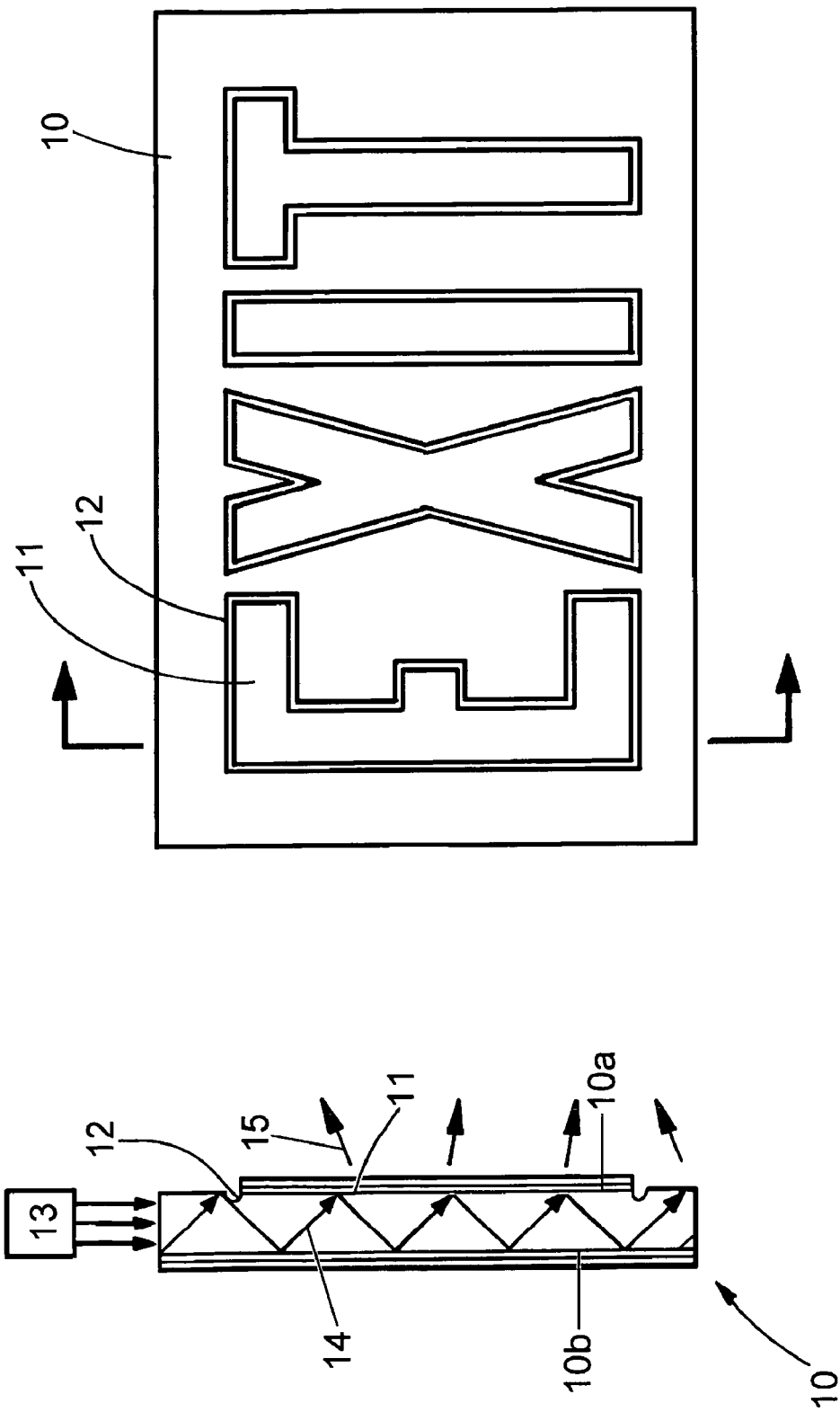
FIG. 2 is a perspective view of a prior art edge-lit emergency sign with legend coating applied on the front face of the panel.
Figure 3:
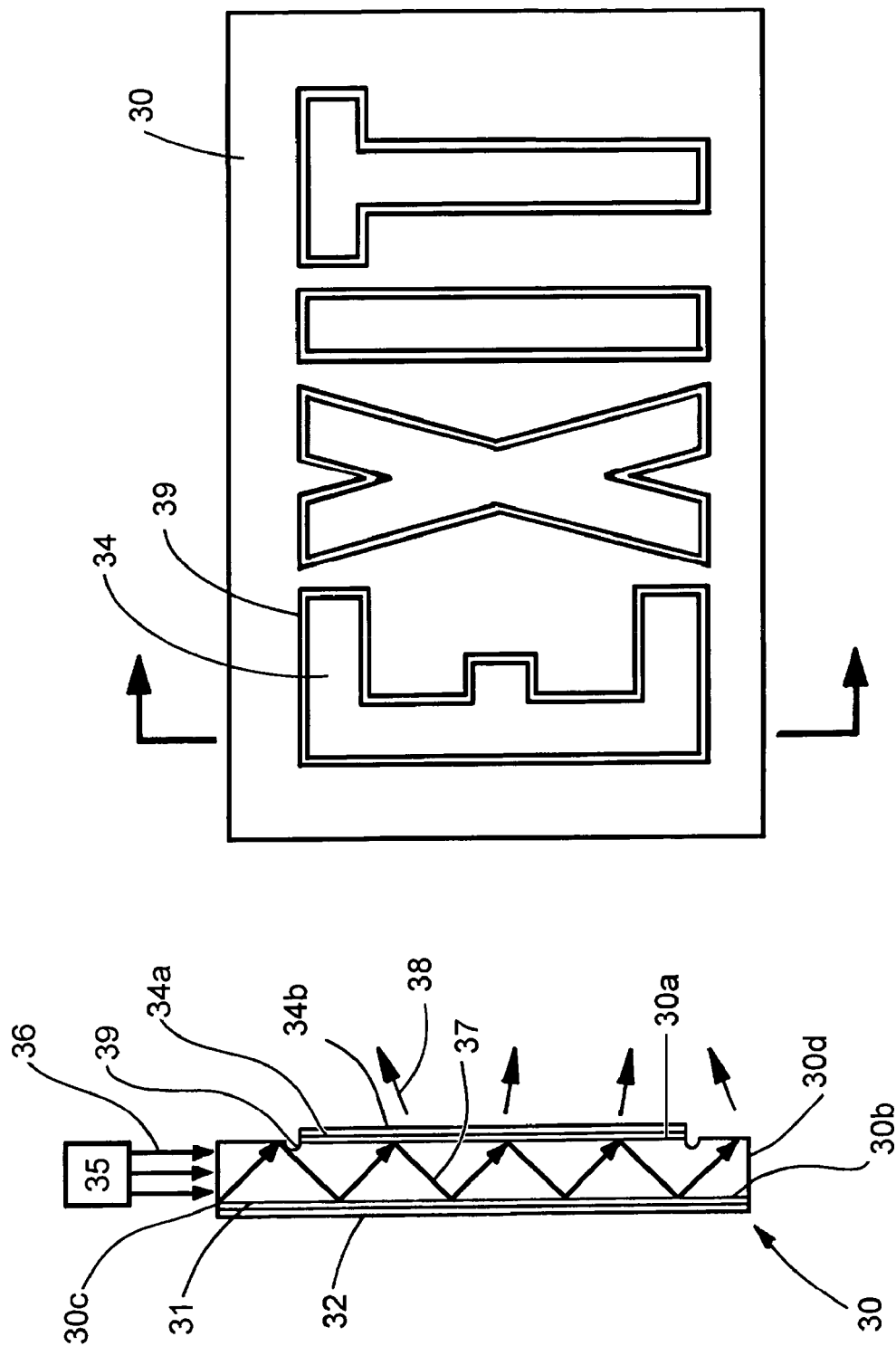
FIG. 3 is a perspective view of an edge-lit emergency sign of the present invention with photo-luminescent (PL) layer added on the back of the panel.

Referring to FIG. 3, there is shown a perspective view of an edge-lit panel emergency sign according to one embodiment of the present invention.

The edge-lit panel shown in FIG. 3 is a rectangular shaped panel 30 formed of acrylic plastic or other clear materials. The panel 30 includes a front side 30a and a back side 30b. The surface of the back side 30b may preferably be clear or matted (frosted). The panel 30 also includes side edges, top edge 30c and bottom edge 30d. A layer of PL material 31 is added on the back side 30b of the panel 30. A white, opaque lamination 32 such as plastic or paper is preferably glued on the PL layer 31 to increase the layer reflectivity.

The panel 30 further includes a legend 34 including the word "EXIT" printed on the front side 30a of the panel 30 by using two consecutive layers 34a and 34b of semi-transparent materials (screening ink, plastic lamination, etc.). The first layer 34a is white and has the role to split the light. The second layer 34b is colored with either red, green, blue, etc. A light source 35 is placed at the top edge 30c and therefore panel 30 is illuminated from the top edge 30c as shown. The light falls from the top edge 30c of the panel 30 as shown by straight vertical lines 36. Part of the light is reflected back into the panel 30 as shown by lines of multiple reflections 37, thereby energizing the PL 31 on the background. The other part passes through as shown by lines of multiple refractions 38, and lights the second layer 34b of the legend 34. The second layer 34b, is colored and is illuminated by refracted light 38 coming from the panel. With this method, the legend 34 can be internally illuminated, i.e., red looks red in the panel 30 during complete darkness. A legend contour 39 may optionally be engraved on the legend side of the panel 30 as shown in FIG. 3.

The word "EXIT" in the legend 34 is illuminated by the light source 35. This illumination is reflected in the forward direction through the panel 30 making the "EXIT" sign visible and is also illuminated in the reverse direction to energize the PL 31 in the back side 30b. The light source 35 keeps the word "EXIT" in the legend 34 illuminated as long as there is power to the source 35. However, when the power to the source 35 is cut, the word "EXIT" in the legend 34 remains visible only due to the PL coating 31 on the back side 30b serving as a background to the panel 30. This PL based background will still glow in the dark keeping the word "EXIT" in the legend visible during long lasting power failures.

Figure 4A:
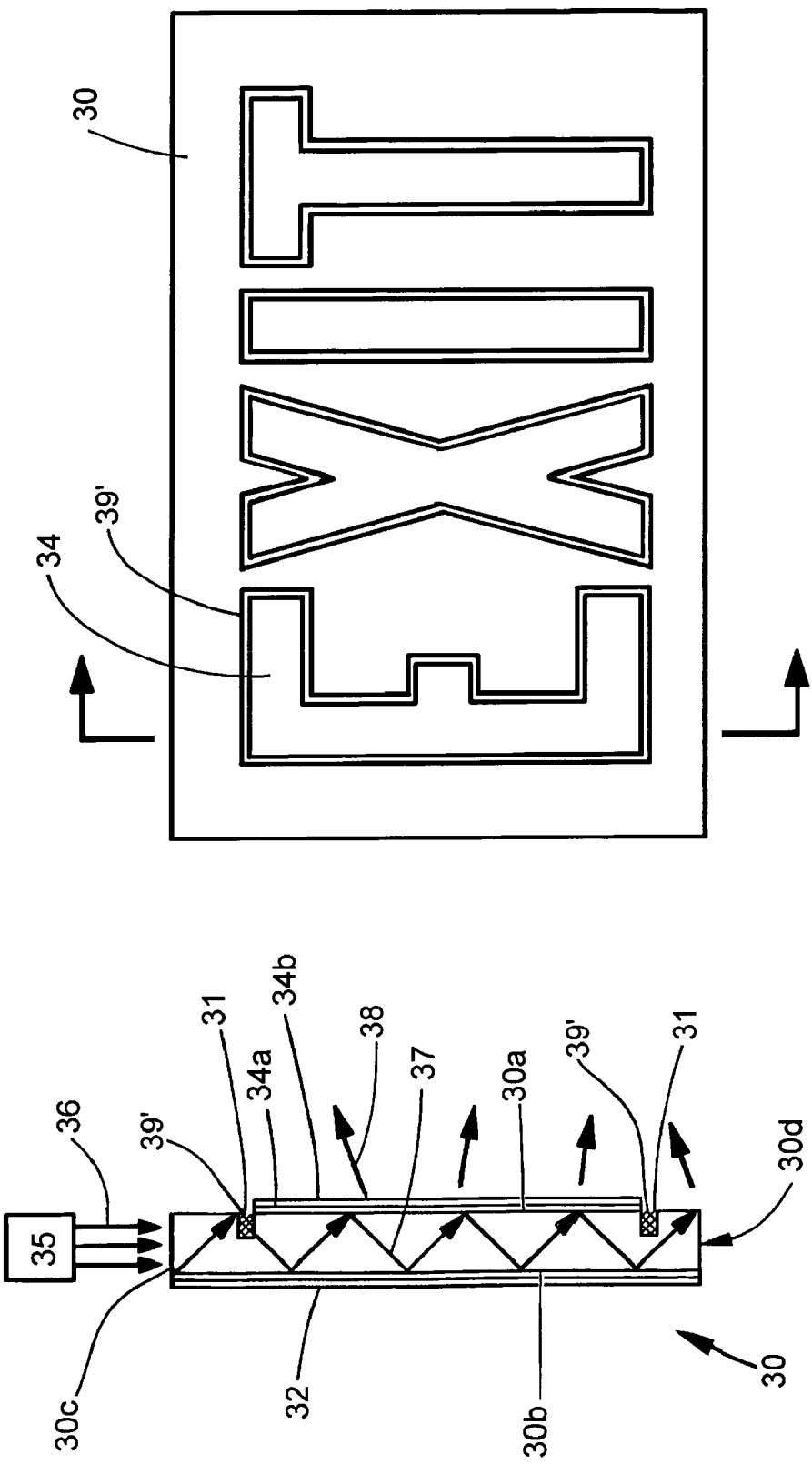
FIG. 4a is a perspective view of an edge-lit emergency sign of the present invention with the legend and PL contour engraved on the front of the panel.
Figure 4B:
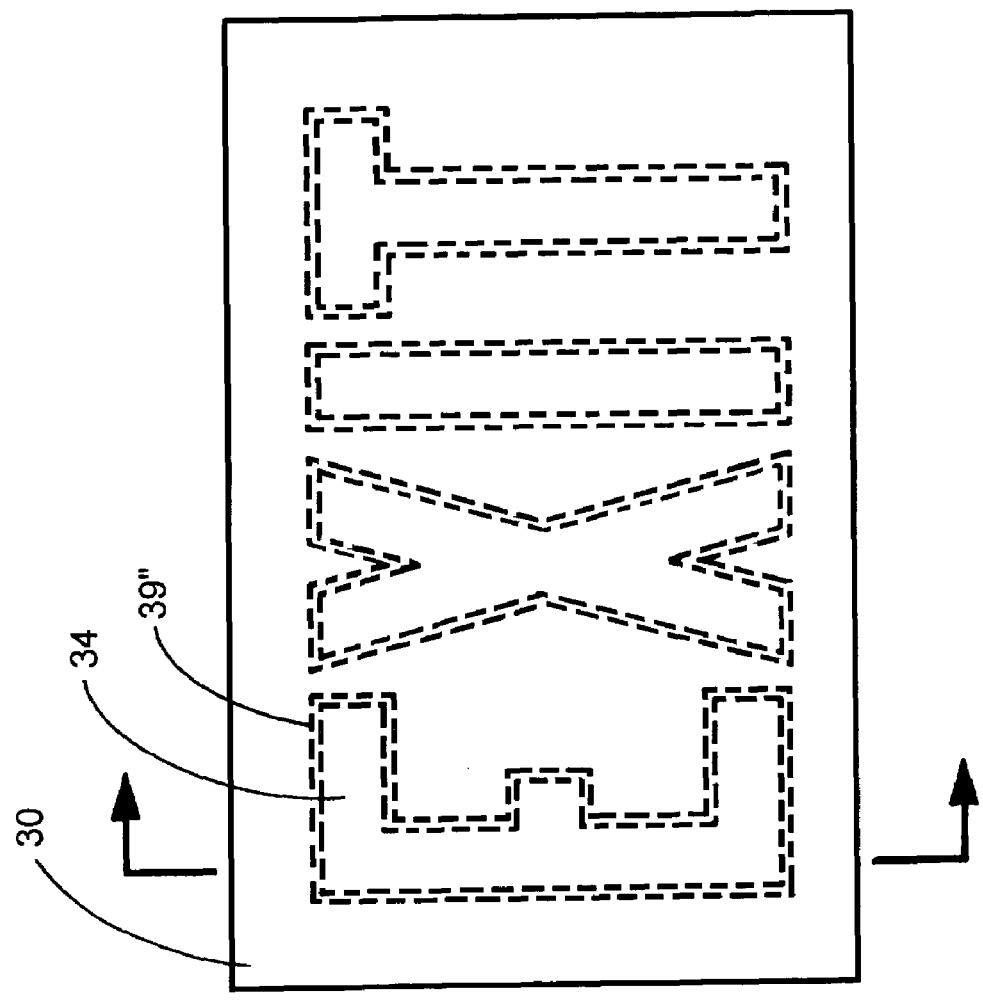
FIG. 4b is a perspective view of an edge-lit emergency sign of the present invention with the legend and PL contour engraved on the back of the panel.
Figure 4B:
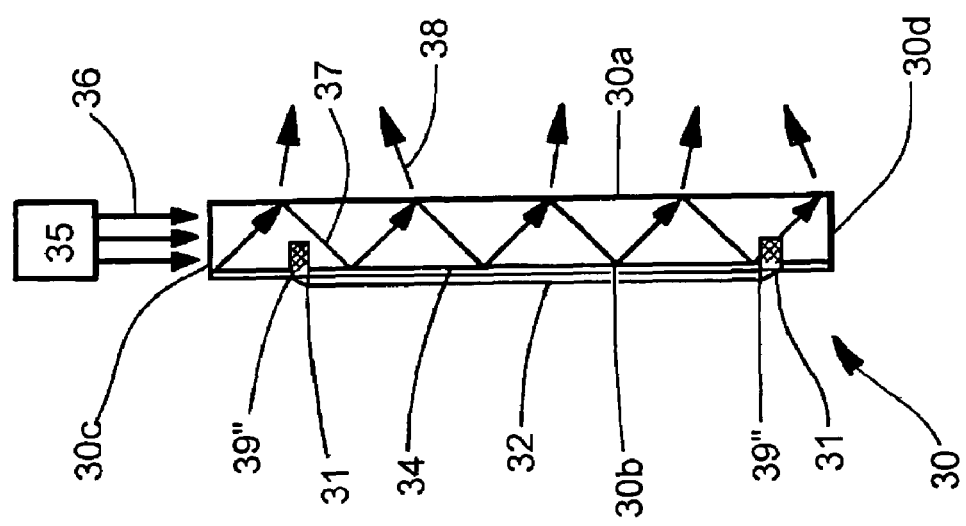

Referring to FIG. 4, there is shown a perspective view of edge-lit panel 30 emergency sign according to an alternate embodiment of the present invention.

Specifically in FIG. 4a, the legend 34 including the word "EXIT" is printed on the front side 30a using the white layer 34a and the colored layer 34b as in FIG. 3. Also, the contour 39' is engraved on the word "EXIT" in the legend 34, also on the front side 30a. This engraving contour 39' is coated with PL material 31. Additionally, similar to FIG. 3, the back side 30b of the panel 30 also includes an opaque lamination 32 preferably glued on the backside 30b.

The light source 35 at the top edge 30c of the panel illuminates the word "EXIT" in the legend 34. However, during power failure of the source 35, the word "EXIT" in the legend 34 remains visible only due to the PL coating 31 on the contour 39'. This PL based text contour glows in the dark keeping the outline of the word, "EXIT" visible during long lasting power failures.

In FIG. 4b, the legend 34 including the word "EXIT" is printed on the back side 30b. Also, the contour 39" is engraved about the legend 34 on the back side 30b. This engraving contour 39" is coated with PL material 31. Also, preferably the white reflective layer 32 is applied on the back side 30b of the panel 30 as shown. The light source 35 at the top edge 30c of the panel illuminates the word "EXIT" in the legend 34. This illumination is reflected forwardly through the panel 30 making the "EXIT" sign visible and is reflected back to energize the PL coating 31 in the contour 39". During the power failure of the source 35, this PL based text contour glows in the dark keeping the outline of "EXIT" visible.

Figure 5:
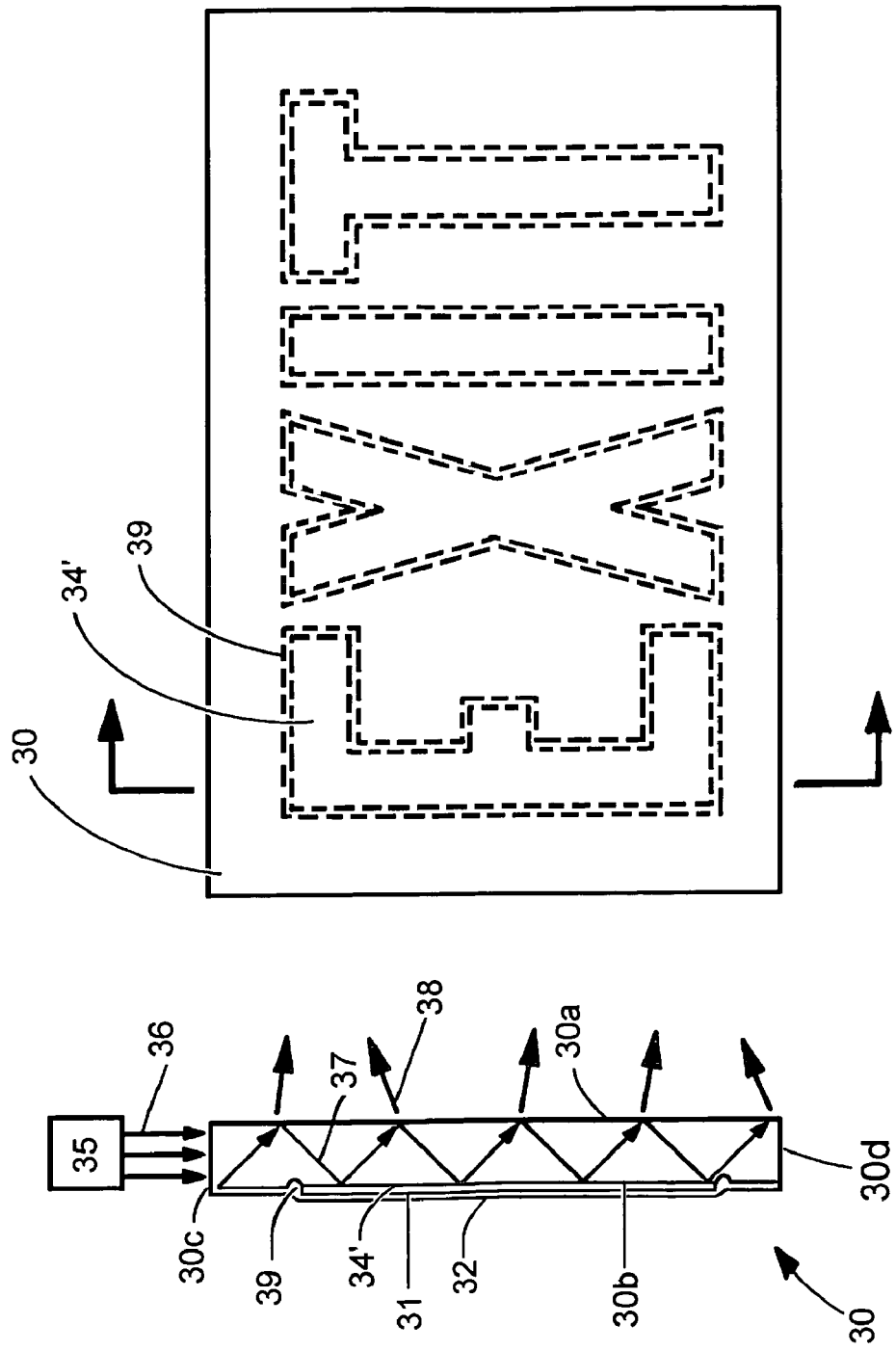
FIG. 5 is a perspective view of an edge-lit emergency sign of the present invention having the PL legend with clear or colored opaque background.

Referring to FIG. 5, there is shown a perspective view of edge-lit panel according to an alternate embodiment of the present invention. The legend 34' including the word "EXIT" is printed on back 30b of the panel 30 and coated with the PL material 31. Preferably a layer of clear or colored opaque lamination 32 is glued on the back side 30b of the panel 30. Again the contour 39 may optionally be engraved on or about the legend 34', and also on the back side 30b of the panel 30.

The word "EXIT" in the legend 34' is illuminated by the light source 35. This illumination is reflected in the forward direction through the panel 30 making the word "EXIT" in the legend 34' visible in the front side 30a. The source 35 also illuminates in the reverse direction to energize the PL 31 in the legend 34 in the back side 30b. The light source 35 keeps the word "EXIT" in the legend 34' illuminated as long as there is power to the source 35. However, when the source 35 is cut, the word "EXIT" in the legend 34' remains visible only due to the PL coating 31 on the legend 34' itself. This PL based legend will still glow in the dark keeping the word "EXIT" visible long after a power failure.

Therefore, in the present invention, the photoluminescence material can be operatively coupled with an active illumination means, to provide fail-safe illumination when the active lighting elements fail or are interrupted in operation. The invention thus combines a passive illumination means (photoluminescence) with an active illumination means (powered lighting source), in such a way that operational efficacy of the passive system is assured in the event of loss or interruption of the normal operation capability of the active system.

Photo-luminescent materials are well known in the art, and include for example strontium oxide aluminate, zinc sulfide, calcium sulfide, and strontium sulfide. The intensity of illumination provided by photo-luminescent materials begins to decay immediately upon the removal of ambient or charging light. However, human visual perception increases shortly after the removal of ambient light, as physiological adjustments occur to the eye, and individuals progress to the achievement of "night vision." Thus, photo-luminescent materials may provide sufficient luminous energy to a sign to render it readable for several hours following the removal of ambient or powered light.

The active lighting means in the illumination device of the present invention may be of any suitable type and configuration that sufficiently illuminate the display in low or no ambient light conditions. Such active lighting source may comprise, for example, incandescent bulbs, LEDs, fluorescent tubes, electroluminescent lamps, or combination thereof.

The active lighting source may be positioned in any location that suitably illuminates both the display and the photoluminescent material. In a preferred embodiment, the active lighting source may be placed on the top of the panel as discussed above. The active lighting source may be powered by any appropriate configuration of power supply and wiring or other energizing circuitry, as are well known in the art associated with the respective active lighting element types.

While the particular embodiments of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is

1. An edge-lit panel comprising:
a front side and a back side, an opaque lamination adhered on said back side;
a layer of photo-luminescent (PL) material disposed entirely on the back side; and
a legend printed on said front side using first and second layers of semi-transparent materials, wherein said first layer is white and said second layer is colored.

2. The panel of claim 1 further comprising:
a contour engraved on the legend to accentuate a contrast between the legend and the front side.

3. The panel of claim 1 further comprising:
a light source disposed at a top edge of the panel to provide illumination forwardly to the legend.

4. The panel of claim 3 wherein said light source provides illumination in the back side to energize the PL material.

5. The panel of claim 1 wherein said back side includes a frosted clear acrylic surface.

6. An edge-lit panel comprising:
a front side and a back side, an opaque lamination adhered on said back side;
a legend printed on said front side using first and second layers of semi-transparent materials, wherein said first layer is white and said second layer is colored;
a contour engraved on the legend to accentuate a contrast between the legend and the front side; and
a layer of photo-luminescent (PL) material disposed only in said engraved contour on the front side of the panel.

7. The panel of claim 6 further comprising:
a light source disposed at a top edge of the panel to provide illumination forwardly to the legend and the contour.

8. The panel of claim 6 wherein said back side includes a frosted clear acrylic surface.

9. An edge-lit panel comprising:
a front side and a back side;
a legend printed on said back side using first and second layers of semi-transparent materials, wherein said first layer is white and said second layer is colored;
a contour engraved on the legend to accentuate a contrast between the legend and the back side;
a layer of photo-luminescent (PL) material disposed only in said engraved contour on the back side of the panel; and
a reflective layer applied on the back side of the panel.

10. The panel of claim 9 further comprising a light source disposed at a top edge of the panel.

11. The panel of claim 10 wherein said illumination is reflected forwardly through the panel to provide illumination to the legend.

12. The panel of claim 10 wherein said illumination is reflected towards back of the panel to energize the PL material in the contour.

13. The panel of claim 9 wherein said back side includes a frosted clear acrylic surface.

14. An edge-lit panel comprising:
a front side and a back side, wherein said back side includes an opaque lamination;
a legend printed on said back side using first and second layers of semi-transparent materials, wherein said first layer is white and said second layer is colored; and
a layer of photo-luminescent (PL) material disposed only on said legend.

15. The panel of claim 14 further comprising:
a contour engraved on the legend to accentuate a contrast between the legend and the back side.

16. The panel of claim 14 further comprising a light source disposed at top edge of the panel, said light source providing illumination to both the legend and the PL material.

* * * * *